Feb. 26, 1924.  
G. RITTER  
1,485,340  
APPARATUS FOR APPLYING GRANULAR SURFACING MATERIALS UPON PREPARED ROOFING  
Filed Feb. 11, 1922  
2 Sheets-Sheet 2
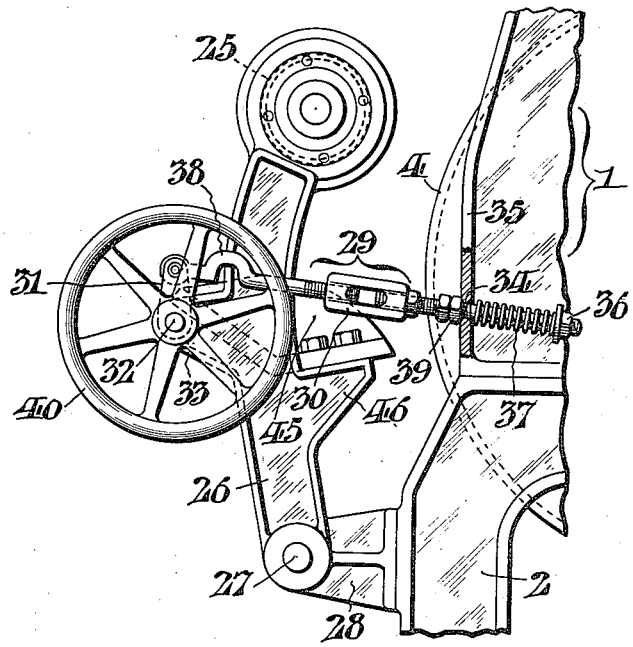
FIG. III.
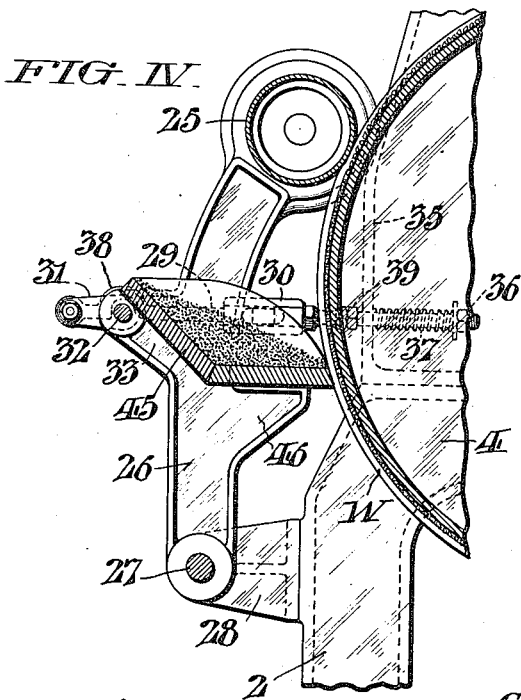
FIG. IV.
WITNESSES:  
John E. Bergner  
Thomas W. Kerr, Jr.
INVENTOR:  
George Ritter,  
BY Fraley Paul  
ATTORNEYS.

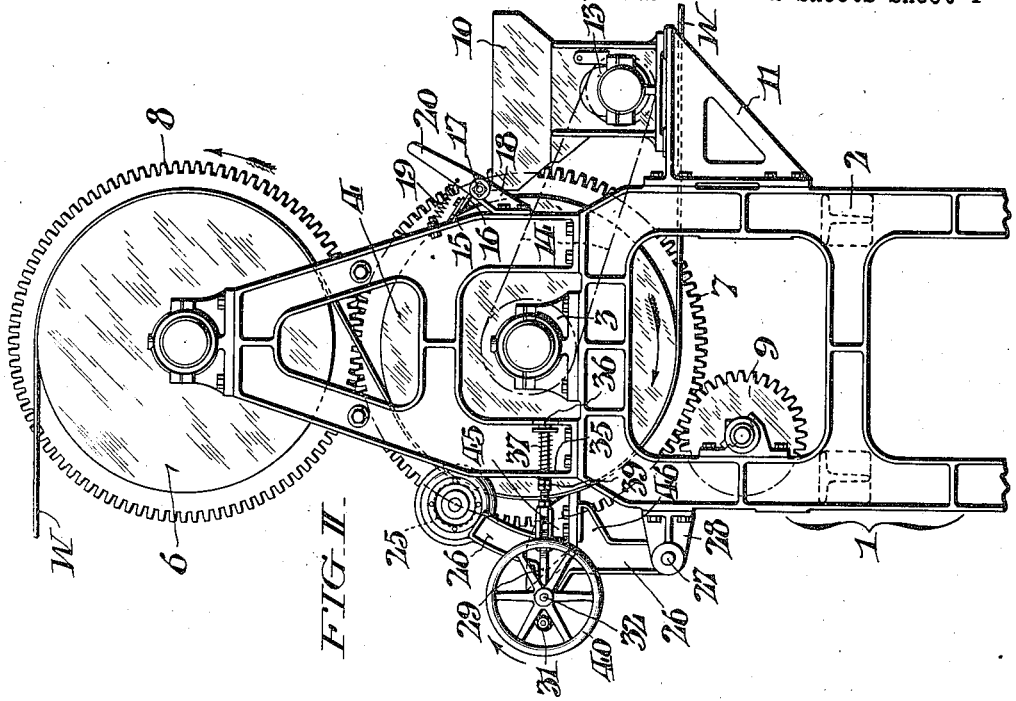
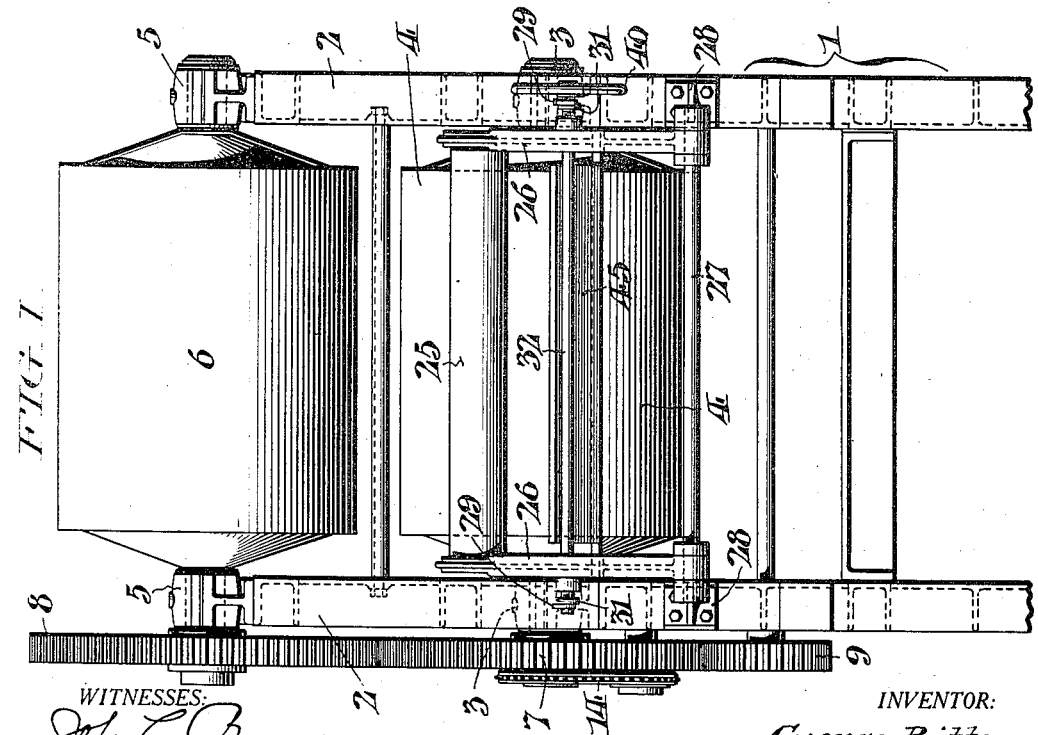

Patented Feb. 26, 1924.

1,485,340

UNITED STATES PATENT OFFICE.

GEORGE RITTER, OF PERTH AMBOY, NEW JERSEY, ASSIGNOR TO THE BARBER ASPHALT COMPANY, OF PHILADELPHIA, PENNSYLVANIA, A CORPORATION OF WEST VIRGINIA.

APPARATUS FOR APPLYING GRANULAR SURFACING MATERIALS UPON PREPARED ROOFING.

Application filed February 11, 1922. Serial No. 535,945.

*To all whom it may concern:*

Be it known that I, GEORGE RITTER, a citizen of the United States, residing at Perth Amboy, in the county of Middlesex and State of New Jersey, have invented certain new and useful Improvements in Apparatus for Applying Granular Surfacing Materials upon Prepared Roofing, whereof the following is a specification, reference being had to the accompanying drawings.

My invention relates generally to apparatus useful in applying granular or pulverulent surfacing materials to a continuously moving base sheet or web. Apparatus of this sort may be advantageously employed in manufacturing sand or emery paper and cloth, or so-called prepared roofing, and the structure hereinafter described is more particularly adapted for the latter use.

In the manufacture of prepared roofing, a mineral protective and ornamental coating, which may be of sand, pebbles, crushed brick or slate, (the materials being selected in accordance with the color or character desired in the finished product) is applied to the surface of a base sheet or web usually of paper or felt prepared by impregnation and saturation with a suitable waterproofing substance and provided upon one side with a layer or coat ordinarily of a bituminous compound or composition. The surfacing is usually applied immediately after the base sheet or web has been coated, as explained, and when the bituminous compound or composition is still hot and in a semi-molten condition, so that advantage may be taken of its adhesive characteristics when in this condition in holding the mineral surfacing. Notwithstanding the stickiness of the bitumen, it has been found in practice that the surfacing will, after exposure to the weather for a short while, become loose and drop away, unless well embedded initially in the course of manufacture of the roofing.

Amongst the objects of my invention are to absolutely insure the latter of the conditions above noted with a view to enhancing the longevity of the roofing in use, and to enable the surfacing operation to be carried on in a continuous and efficient manner.

This desiderata I attain in an apparatus which in itself comprehends various novel features, whose advantages will become readily apparent from the detailed description which follows:

In the drawings, Fig. I is an elevation of an apparatus for continuously applying protective and ornamental mineral surfacing material to the base sheet or web of prepared roofing, conveniently embodying my invention.

Fig. II is an end elevation of the structure, as observed from the right of Fig. I.

Fig. III is a detail view in elevation and on an enlarged scale showing more particularly the means whereby the mineral surfacing is pressed into the bituminous coating of the base sheet or web, said means being illustrated in retracted position; and Fig. IV is a view generally similar to Fig. III but showing the parts of the means aforesaid in active position and in section.

The organization of elements which I have herein chosen for purposes of illustration comprises a supporting structure 1, which includes side frames 2—2, whereto are mounted bearings 3—3 for a hollow main roll 4 (about which the web "W" to be surfaced is continuously passed as hereinafter explained) and also bearings 5—5 for the journalling of a similar superposed companion roll 6. These rolls are coordinated for synchronous rotation in the directions indicated by the arrows in Fig. II, through the instrumentality of intermeshing gears 7—8 which are respectively secured to the projecting trunnions of the rolls beyond the frame 2 at one side of the machine, see Fig. I. Motion is transmitted to the rolls 4, 6 from a source of power, not shown, through the medium of a gear pinion 9 meshing with the gear 7.

The base web, or sheet, after having been coated with a layer of a suitable compound or composition preferably of bitumen and while the latter is still in a hot, semi-molten condition, is first passed, coated side up, toward the main roll 4 so as to move horizontally beneath a hopper 10. Said hopper is sustained by brackets 11 extending rearwardly from the side frames 2—2, and, in practice, is proportioned to hold an adequate supply of the surfacing material which, as already explained, may consist of finely divided mineral matter such as sand, pebbles, crushed brick or slate. The flow of the material from the hopper is controlled by a suitable adjustable rotative governing means not detailed in the drawings, but comprehensively indicated at 13, and shown as being driven by a sprocket chain 14 from the axis of the main roll 4.

After receiving the surfacing material, the web "W" passes upward about one side of the main roll 4 in the course of which the surfacing material is securely embedded by means which will be presently described, and further on, its direction is reversed in passing about the companion roll 6. Upon leaving the latter, the finished roofing may be conducted to other machines or apparatus for the performance of further operations upon it as may be desired. Any surfacing material adhering to the main roll 4 is collected by a transversely extending scraper blade 15 which is secured to arms 16 fixed to a rock shaft 17 journalled in fixed bearing brackets 18. Said scraper blade is held in tangential contact with the roll 4 by means of helical springs 19 operative upon the handles 20, which are fixed to the shaft 17, and provided for the purpose of retracting the blade when necessary. The collected material, by virtue of the inclination of the scraper blade 15, is automatically directed back into the hopper.

Cooperative with the main roll 4 is an auxiliary roll 25, which, as the web passes about said main roll, exerts sufficient pressure to insure embedding of the surfacing material to a substantial depth in the moving base web such as will preclude the possibility of dislodgment under ordinary conditions of subsequent usage. The opposite ends of the auxiliary roll 25 are supported for free rotation by arms 26—26 secured to a transverse pivot shaft 27 mounted in bearing brackets 28—28 projecting forwardly from the frames 2—2. Associated with the arms 26—26 are draw bars or rods 29—29 which have interposed in them, for the purpose of permitting linear adjustment, turn buckles 30, and which are pivotally attached at one end to crank arms 31—31 fixed upon a shaft 32 supported for rotation jointly by the said arms, the latter being provided with suitable bearing lugs 33—33 wherein said shaft is journalled. The opposite extremities of the bars or rods 29 extend through guide apertures 34 in the webs 35 of the frames 2, and compressed between said webs and heads or nuts 36 adjustably set on the protruding ends of the rods are encircling helical springs 37 which serve to normally maintain the auxiliary roll 25 in pressure contact with the web "W" as it passes about the main roll 4. From Figs. III and IV, it will be observed that the rods are bent as at 38 to afford a recess to clear the shaft 32 so that a normal dead center position of the crank arms 31 may be maintained under the action of the springs 37 upon the rods.

In order that the auxiliary roll 25 may be retracted to permit introduction of the web beneath the same initially, I have made provisions as follows:

Appended to the shaft 32 is a hand wheel 40 which, when turned through an angle of ninety degrees clockwise in Fig. II, brings the crank arms 31 to the vertical position shown in Fig. III. Immediately upon the initiation of this movement, collars or nuts 39 adjustably set upon the rods 29 are brought to bear against the outer face of the webs 35 of the frames previously referred to and arrest further longitudinal movement of the rods. As a result, the greater portion of the movement of the crank arms 31 is absorbed in swinging the arms 26 with respect to the rods, and hence in retracting the auxiliary roll 25 from the main roll 4. It is to be especially noted that in the normal position of the mechanism just described, the nuts 39 clear the webs 35 of the frame sufficiently to allow activity of the springs 37 in functioning to maintain the auxiliary roll in yielding contact with the web. The pressure exerted upon the auxiliary roll may obviously be varied by adjusting the tension of the springs 37 by progressing the abutment heads 36 backwards or forwards along the rods.

In order to prevent adhesion of the back of the web "W" to the auxiliary roll 25, I provide for the application, previous to the movement of the web beneath the roll, of a suitable anti-stick substance such as soap stone or talc preferably in a finely comminuted or powdered form. This material is supplied from a box or trough 45 which is supported transversely of the apparatus between the arms 26—26, the latter being formed with offsets 46—46 which afford ledges to which the ends of said trough are bolted, as shown to best advantage in Figs. II and III. The trough, furthermore, has an obtuse angular cross section (see Fig. IV), one of its walls, when the arms 26—26 are in their normal position, occupying a horizontal position with its edge in close proximity to the main roll 4, while its other wall, by virtue of its angular disposal, serves to assist gravitation of the powdered substance toward the back of the moving web. In this way, a uniform distribution of the powder on the reverse side of the web is made possible without entailing waste. By placing the hopper adjacent one side of the roll 4, and directly beneath the auxiliary roll 25, any surplus powder released through the movement of the web is free to fall back into the trough. When the arms 26 are swung in the course of the retraction of the auxiliary roll 25, the possibility of spilling the powder is offset by the angular change in the position of the trough as will be readily apparent from Fig. III of the drawings.

Having thus described my invention, I claim:

1. In apparatus for applying surfacing material to a base sheet or web, the combination of a main roll about which the web is passed; a cooperative auxiliary pressure roll; pivot arms by which the auxiliary roll is supported for free rotation; a shaft with cranks carried jointly by the arms; and rods respectively coordinated, at one end, with fixed elements and pivoted at the other to the cranks of the shaft.

2. In apparatus for applying surfacing material to a base sheet or web, the combination of a main roll about which the web is passed; a cooperative auxiliary pressure roll; pivot arms by which the auxiliary roll is supported for free rotation; a shaft with cranks carried jointly by the arms; rods respectively pivotally connected at one end to the cranks of said shaft; fixed guide elements through which said rods extend; springs compressed between said fixed elements and heads on the protruding ends of the rods for normally maintaining the auxiliary roll yieldingly in its active position; and adjustable lock nuts on said rod to engage the fixed elements on the sides opposite the springs.

3. In apparatus for applying surfacing material to a base sheet or web, the combination of a main roll about which the web is passed after application of the surfacing material; a cooperative auxiliary roll for exerting pressure to cause the surfacing material to be embedded in the web; pivot arms by which the auxiliary roll is supported for free rotation; rods associated with said arms; fixed guide elements through which the rods extend; and helical springs compressed between said fixed elements and heads on the protruding ends of the rods so as to maintain the auxiliary roll in pressure contact with the web as it passes about the main roll.

4. In apparatus for applying surfacing material to a base sheet or web, the combination of a main roll about which the web is passed after application of the surfacing material; a cooperative auxiliary roll for exerting pressure to cause the surfacing material to be embedded in the web; pivot arms by which the auxiliary roll is supported for free rotation; rods associated with said arms; fixed guide elements through which the rods extend; helical springs compressed between said fixed elements and heads on the protruding ends of the rods so as to maintain the auxiliary roll in pressure contact with the web as it passes about the main roll; and means interposed between the arms and the rods whereby the said arms may be moved independently of the action of the springs to withdraw the auxiliary roll from the main roll to facilitate initial introduction of the web between the two rolls.

5. An apparatus for applying surfacing material to a base sheet or web coated with a plastic substance in a sticky condition, the combination of a main roll about which the web is passed, face innermost, after application of the surfacing material; a cooperative auxiliary roll for exerting pressure upon the back of the web as the latter passes about said main roll to cause embedding of the surfacing material; pivot arms by which the auxiliary roll is supported for free rotation; means carried by said arms for applying pulverized anti-stick substance to the back of the web previous to passing of the latter beneath the auxiliary roll; and means whereby said arms may be simultaneously moved to retract the auxiliary roll together with the anti-stick applying means in order to facilitate introduction of the web between the rolls initially.

6. In apparatus for applying surfacing material to a base sheet or web coated with adhesive, the combination of a roll about which the material is passed; and a trough for a pulverulent substance having one wall disposed in a horizontal position with its edge extending into close proximity to the web as it passes about the roll at one side, and another wall sloped to assist gravitational feeding of the substance toward the web.

7. In apparatus for applying surfacing material to a base sheet or web coated with adhesive, the combination of a roll about which the material is passed; a trough for a pulverulent anti-stick substance having an obtuse angular cross section, one wall thereof occupying a horizontal position normally with its edge extending into close proximity to the web as it passes about the roll at one side, and the sloping wall assisting gravitational feeding of the substance toward the web; and supporting means capable of being withdrawn with respect to the roll aforesaid to retract the trough, and, at the same time, to effect an angular change in the position of the latter to prevent spilling of the contents.

8. In apparatus for applying surfacing material to a base sheet or web coated with adhesive, the combination of a roll about which the material is passed; a trough for a pulverulent anti-stick substance having an obtuse angular cross section, one wall thereof occupying a horizontal position normally with its edge extending into close proximity to the web as it passes about the roll at one side, and the sloping wall assisting gravitational feeding of the substance toward the web; and supporting arms capable of being swung about a fixed pivot in being withdrawn with respect to the roll aforesaid to retract the trough, and, at the same time, to effect an angular change in the position of the latter to prevent spilling of the contents.

In testimony whereof, I have hereunto signed my name at Maurer, N. J., this seventh day of February, 1922.

GEORGE RITTER.

Witnesses:
D. J. DESMOND,
O. A. OLSEN.